W. Sumner,
Pipe Organ,
No. 635. Reissued Dec. 14. 1858.
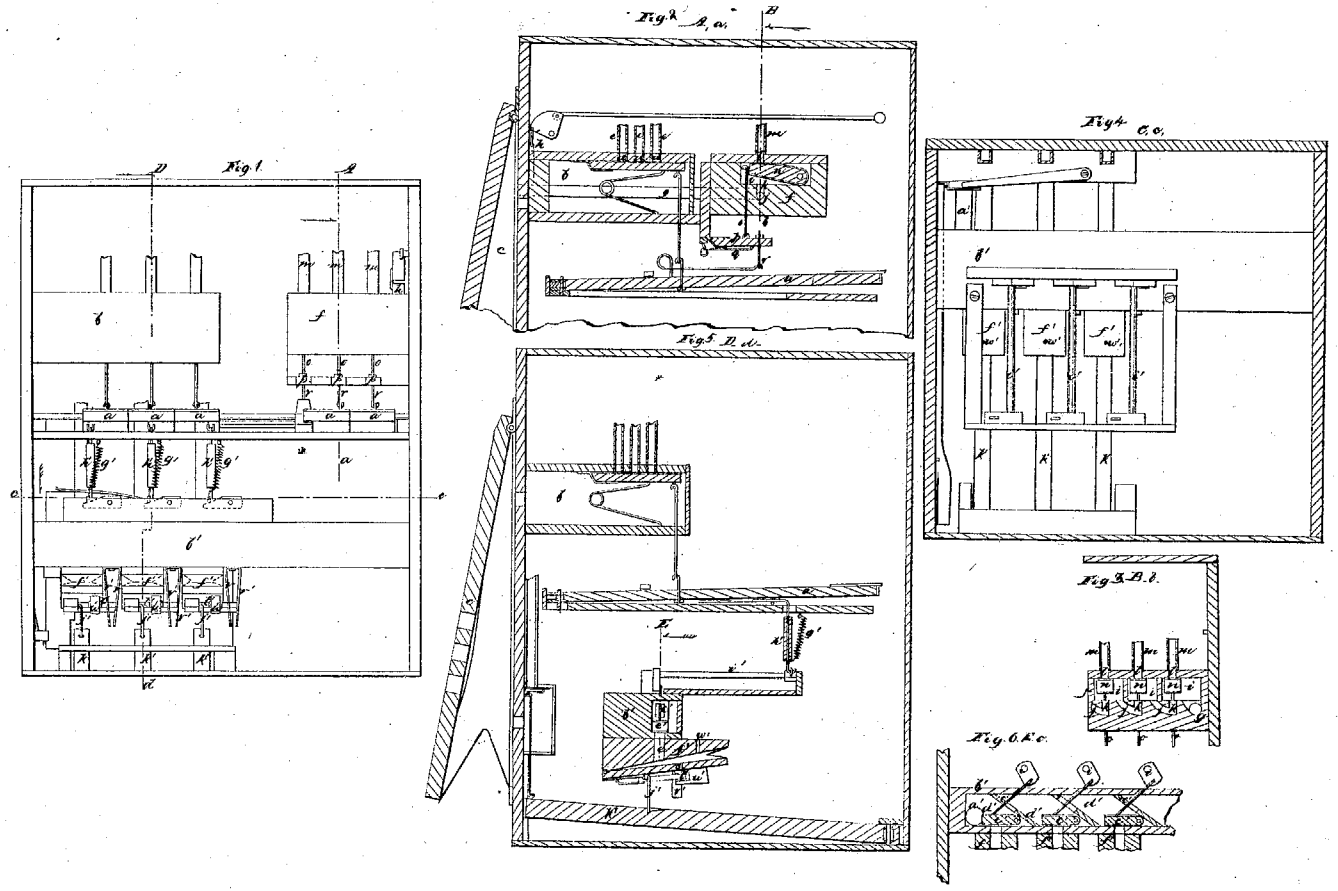
AM. PHOTO-LITHO. CO. N.Y. (OSBORNE'S PROCESS.)

UNITED STATES PATENT OFFICE.

WILLIAM SUMNER, OF WORCESTER, MASSACHUSETTS.

IMPROVEMENT IN ORGANS.

Specification forming part of Letters Patent No. 10,580, dated February 28, 1854; Reissue No. 635, dated December 14, 1858.

*To all whom it may concern:*

Be it known that I, WILLIAM SUMNER, of Worcester, Massachusetts, have invented certain new and useful Improvements in Organs and other Like Musical Instruments, of which the following is a full, clear, and exact description, reference being had to the accompanying drawings, in which—

Figure 1 is a front elevation. Fig. 2 is a vertical section at A *a*, Fig. 1. Fig. 3 is a cross-section at B *b*, Fig. 2. Fig. 4 is a horizontal section at C *c*, Fig. 1. Fig. 5 is a vertical section at D *d*, Fig. 1. Fig. 6 is a vertical section at E *e*, Fig. 5.

The same letters refer to the same parts in all the figures.

In organs as heretofore constructed each key can be made to sound one note in each of a series of stops, and the number of stops can be regulated at pleasure by shutting off or opening them; but when a given number of stops are opened each key that is touched sounds a note in each of the stops.

The object of my invention is to enable the performer to play one or two notes in one or more stops, those notes to be governed by or connected to the extreme key touched on either or both sides or hands without reference to the number of keys touched at once; and to this end the nature of my invention consists in making said extreme key on either side to prevent the operation of the other keys touched at the same time upon said series; and to do this I make a wind-chest having one main passage leading from the bellows, and branches leading therefrom to every pipe in one or more stops, which branches are each governed by a valve which, when opened to admit the wind from the main passage, will at the same time shut off the wind from all the valves beyond it, or shall close or retain closed the other valves on either side. In this way, no matter what may be the number of keys touched, only one note in each stop having this arrangement will be sounded, and that either on the extreme left for the bass or the extreme right for the treble, the others being prevented by the same act from sounding.

The object of the second part of my invention is to operate the pedals which play the sub-bass, and sometimes the basses, by the action of the keys in a similar manner; and as a direct connection from the keys to the pedals or their levers would bring too much labor on the keys, I interpose a series of auxiliary bellows governed by valves, which valves are governed in turn by the keys in the manner before stated, and the bellows give the power to work the pedals and sound the proper note, thus relieving the keys and accomplishing the object as before.

The accompanying drawings represent so much of the machinery of an organ of the usual construction as will be useful in explaining a connection of my improvements, such as the series of keys *a* and the usual wind-chest *b*, which conducts the wind from the main bellows *c* by a pipe, *d*, to the series of pipes *e* for any required number of stops. At the right-hand side there is one of my improved wind chests, *f*, for the treble, which receives wind from the main bellows by the pipe *g*, the aperture of which is governed in the usual manner by a sliding stop, *h*. The main passage consists of a series of chambers, *i*—one for each note in the scale—and the bottom of each chamber has two apertures, *j* and *k*—one to receive the wind and the other to permit it to pass to the next chamber—and one aperture, *l*, at the top leading to a channel communicating with a pipe, *m*, or a series of pipes, if there be more than one stop. In each channel there is a hinged valve, *n*, which, when borne up, closes the aperture *l* at top, and when drawn down opens this aperture *l* and closes the aperture *k* at bottom, which prevents the wind from passing to the chamber beyond. Each valve is connected by a rod, *o*, with a spring-lever, *p*, below, the tension of whose spring *q* tends constantly to keep the valves up against the aperture at top, and this lever is in turn connected by a rod, *r*, with a corresponding key, *a*.

From the foregoing it will be seen that all the keys connected with the valves in the chest will, when touched, operate the corresponding valves; but as the wind comes in from the right-hand side, and the touch of the keys draws down the corresponding valve to open the aperture at top, and at the same time closing the apertures *k* at bottom through which the wind passes to the next chamber on the left, the consequence will be that, no matter what number of keys connected with this chest may be touched at once, the one on the extreme right alone will sound a note, because the valve connected therewith in the act of opening the aperture at top to admit the wind to its pipe or pipes, at the same time closes the aperture at bottom, which leads to the next chamber on the left side of it, and hence from all beyond it. In this way, no matter what may be the number of parts played, the treble only—that is, the note on the extreme right—will be sounded in the extra stop or stops connected with this chest, so that at the pleasure of the performer he can give predominance to the treble.

It will be obvious from the foregoing that a like arrangement can be employed for the left or bass side by reversing its operation, so that the extreme left note only will be sounded; and it will also be obvious that, if desired, the extra stop or stops can be so arranged in connection with my invention that the note produced by the extreme left key touched will vary one or more octaves from that sounded in the usual stops. The main bellows connects by a pipe, *a'*, with another wind-chest, *b'*, having one main passage, *c'*, through which the wind passes from left to right; and from this main passage there are a series of branches, *d'*, with a valve, *e'*, at the juncture of each branch with the main passage, each branch connecting with one of a series of auxiliary bellows, *f'*. At the bottom of each key there is a rod, *h'*, drawn up by the tension of a spring, *g'*, and this rod is in turn connected with one arm of a rock-shaft, *i*, the other arm of which is connected with a corresponding valve, *e'*, in the chest *h'*, so that when the keys *a* are pressed down the corresponding valves in the chest will be operated to open the branches leading to the auxiliary bellows, and closing the main passage, so that the wind from the main bellows can only pass into the branch which corresponds with the extreme left of the keys touched, on the principle before explained. The wind is thus admitted from the main bellows to the corresponding auxiliary bellows, and will fill it and force down its flap, which is connected, by a rod, *j*, with a pedal, *k'*, of a series connected in the usual way with the sub-bass or other pipes usually played by the pedals. In this way I am enabled to play with the keys the notes of which heretofore, for the want of sufficient power in the fingers, had to be played with the feet, and to sound only that note which corresponds with the extreme left key touched, no matter what number of keys may be touched at one and the same time to play the usual stops. The return of the auxiliary bellows is self-acting. In the bottom flap there is an aperture, *s'*, of less capacity than the aperture which admits the wind from the branch of the wind chest; and below this aperture there is a valve, *t*, on the end of an arm hinged to the frame, and the forward end of this arm rests on a bracket, *u'*, attached to the flap, so that when resting on the bracket the aperture is open, and this arm works between two friction-plates, *v' v'*, so that when the wind rushes into the bellows, the escape-aperture being smaller than the inlet, the flap will be suddenly forced down onto the valve, which closes the aperture until the flap is entirely forced down. In the upper plate of the bellows there is a small aperture or vent, *w'*, which permits a slight escape of wind, and just enough to permit the flap, after the required time, to rise, and so soon as it begins to rise it leaves the valve *t'*, to permit the air to rush out, and the flap and the pedal connected therewith to return to its original position, the bracket at the same time carrying up the arm and valve *t'*.

I have used the terms "auxiliary bellows" to designate the apparatus which receives the wind from the main bellows to work the pedals, although, strictly speaking, they are not bellows, but pneumatic flaps, and therefore any apparatus which will secure an equivalent action from the wind can be substituted for them; and although I have stated that the wind is supplied by the main bellows, I do not wish to be understood as limiting myself to the use of the organ-bellows, as any other blowing apparatus may be used instead.

The object of forming the connection between the key *a* and the rods that operate the valves is to ease the action on the valves when thrown up to open the branch and close the main passage; but this is not indispensable, as I do not wish to limit myself to the use of either of the two kinds of valves above described, as any valve or valves which by the action of the keys will open the branches and close the main passage, or in any way prevent the wind entering any other branch or pipe than the one corresponding to the extreme key touched, may be substituted for those described. Nor do I wish to limit myself to any particular construction of the parts by which I accomplish the results attained.

I have described two variations or modifications of the wind-chest and valves, and it is obvious that others may be made, or the controlling-power made in the connections or between the keys and valves by the mere substitution of equivalents, without departing from the principles and character of my invention. Nor do I wish to be understood as limiting myself to the application of my invention to organs, as it is equally applicable to other instruments wherein it is desirable to play with stops in addition to the keys.

What I claim as new, and desire to secure by Letters Patent, is—

1. The combination or arrangement and connection, with the keys, of a mechanism which shall enable the extreme key touched on either side, or both, when operating itself shall prevent all the others from operating in the stop or stops connected therewith, in the manner and for the purposes as above set forth and described.

2. In combination with a wind-chest operating substantially as above described, the employment of auxiliary bellows connected and combined with the main bellows and pedals, substantially as and for the purposes described.

3. Controlling and operating the escape-valve by means of friction on the arm or its equivalent, in the manner and for the purposes above set forth and described.

In witness whereof I have hereunto set my hand in the presence of two witnesses.

WILLIAM SUMNER.

Witnesses:

J. E. HITCHCOCK,
JAS. G. ARNOLD.